United States Patent Office 3,512,236
Patented May 19, 1970

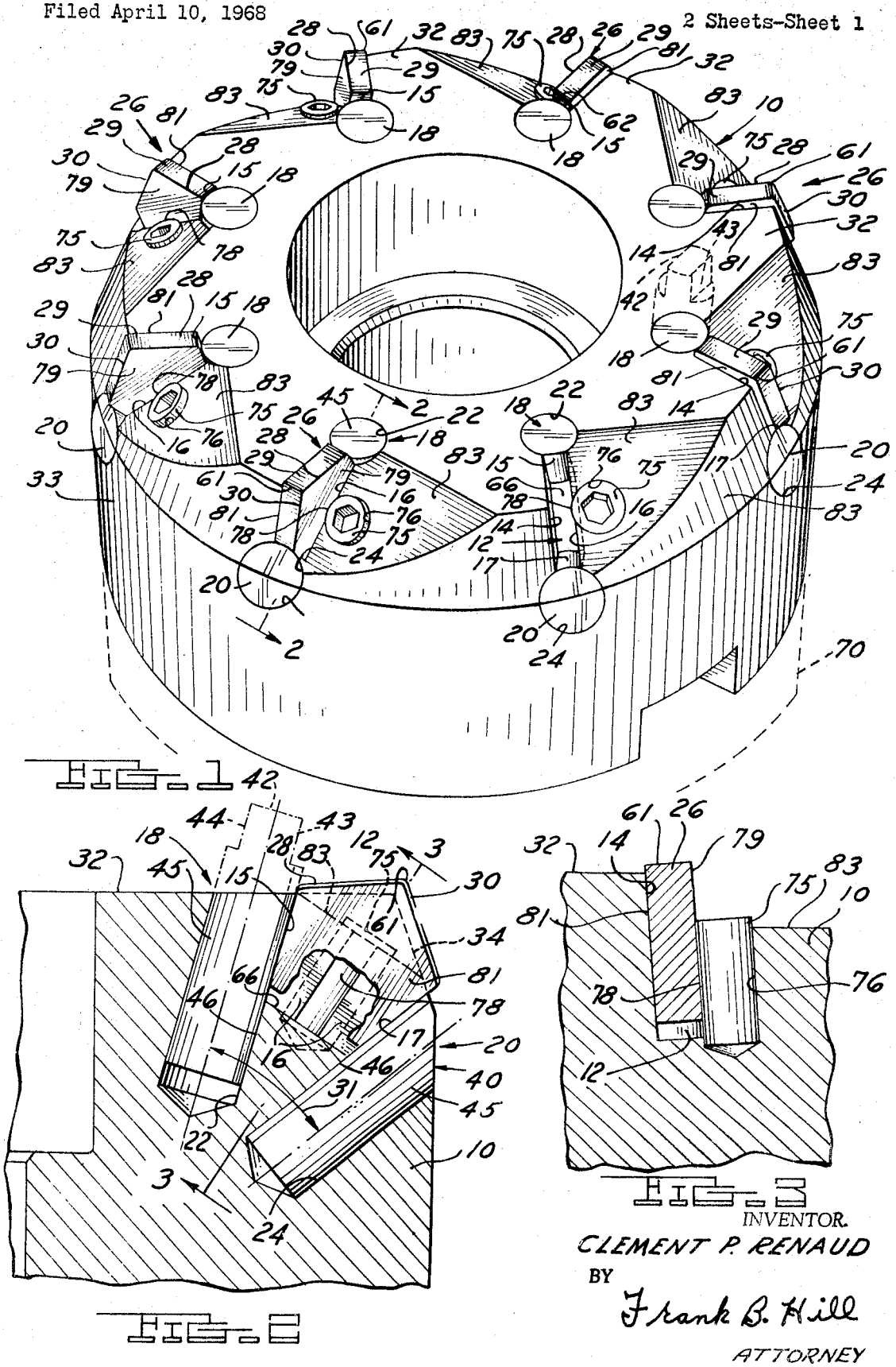

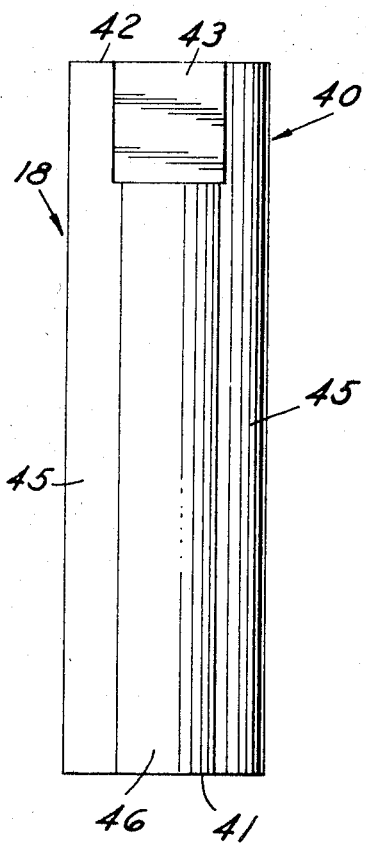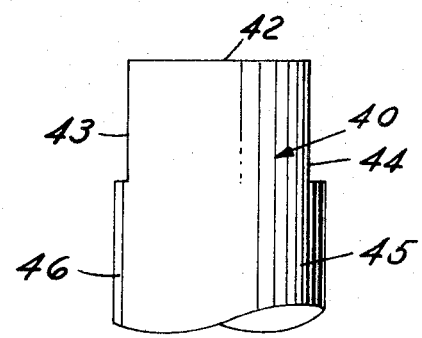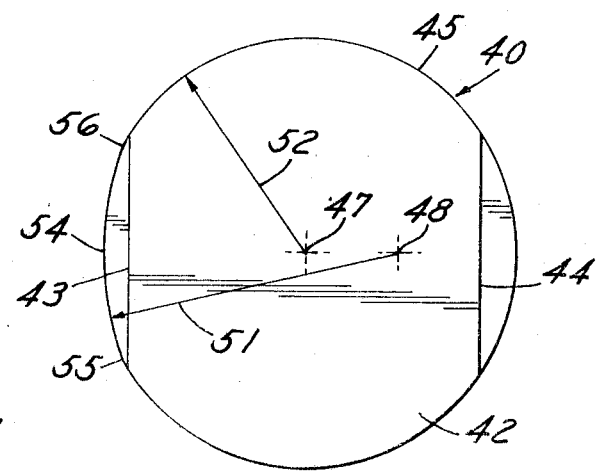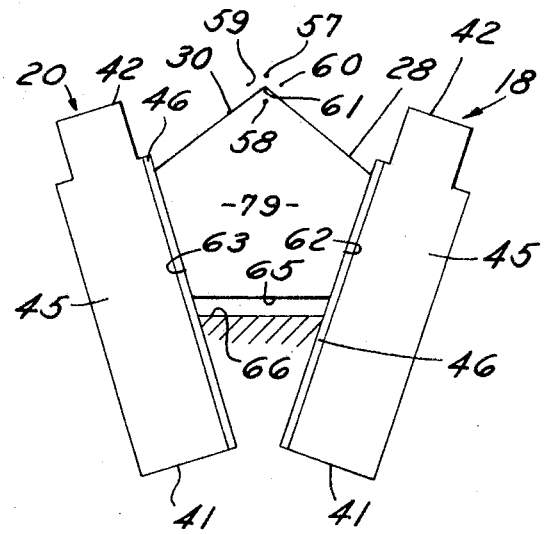

3,512,236
MILLING CUTTER WITH INSERT LOCATING PINS
Clement P. Renaud, Dearborn Heights, Mich., assignor to Willey's Carbide Tool Company
Filed Apr. 10, 1968, Ser. No. 720,173
Int. Cl. B26d 1/12; B21k 5/00
U.S. Cl. 29—105                                    10 Claims

ABSTRACT OF THE DISCLOSURE

This invention relates to a milling cutter having removable indexable cutting insert bits where the bits are located by cam surfaces on solid dowel type locating pins permitting precise locating of the cutting surfaces on the indexable cutting insert bits and the method of assembling the milling cutter by adjusting the cam surfaces of the locating pins during fabrication.

---

This invention relates generally to milling cutters of the removable indexable cutting insert type and in its specific embodiment to the means of locating the cutting inserts and the method of providing and adjusting the locating means during fabrication.

Indexable cutting inserts for use with milling cutters and other tooling arrangements have become quite popular and various methods of assembling and locating these units have been set forth to provide for the highest of precision in manufacturing these milling cutters. An example of one of the present milling cutters having indexable cutting inserts is illustrated in United States Pat. 3,163,920 which issued Jan. 5, 1965. This type of milling cutter has proved to be reliable and very successful in commercial operation. However, many of the milling cutters with insert type cutter bits require high manufacturing precision to be built into the unit and are expensive to purchase.

The milling cutter, as illustrated in United States Patent 3,163,920, requires accurate machining positions between the bores holding the locating pins and the parallel side walls of a pocket holding the indexable cutting insert is quite critical and under heavy load with non-solid and rigid locating pins there could be some give of the locating pins to alter the specific cutting precision position of the indexable cutter insert. If the locating pin bores are not at their critical location the complete milling cutter head can be a scrap part. Therefore, it is an objective of the present invention to provide solid locating pins to position the indexable cutting insert off of.

Another object of the present invention is to provide locating pins having cam surfaces which can precisely locate a cutting insert to a desired cutting location.

A further object of the present invention is to provide adjustable locating pins having cam surfaces which can precisely locate indexable cutting inserts over a desired range of predetermined cutting locations.

A still further object of the present invention is to provide a method of assembling a milling cutter having a series of related cutting insert pockets with solid adjustable locating pins to position the cutting surfaces of removable indexable cutting inserts at a predetermined cutting position in the pockets, then cutting off the adjustable head ends of the adjustable locating pins after the cutting pocket locating surfaces are established.

To the accomplishment of the foregoing and related ends, the invention then consists of the methods and means hereinafter fully described and particularly pointed out in the claims, the annexed drawings and the following description setting forth in detail certain means and modes of carrying out the invention, such disclosed means and modes illustrating, however, but several of the various ways in which the principle of the invention may be used.

In the annexed drawings:

FIG. 1 is a perspective view illustrating the principles of the present invention in conjunction with a milling cutter having a series of cutting insert pockets positioning indexable cutting inserts.

FIG. 2 is a partial sectional view of the milling cutter showing an indexable cutting insert positioned in a cutting insert pocket and illustrating the principles of the present invention, taken substantially along line 2—2 of FIG. 1.

FIG. 3 is a partial sectional view of a portion of the milling cutter showing the means securing an indexable cutting insert in a cutting pocket and illustrating principles of the present invention, taken substantially along line 3—3 of FIG. 2.

FIG. 4 is a front plan view of the adjustable locating pin illustrating the principles of the present invention.

FIG. 5 is a partial side view showing the top portion of the adjustable locating pin shown in FIG. 4 illustrating the principles of the present invention.

FIG. 6 is a top plan view of the adjustable locating pin shown in FIGS. 4 and 5 illustrating one example of the present invention and showing the means of generating the cam surface.

FIG. 7 is a partial sectional view similar to FIG. 2 but facing in the opposite direction to the arrows of line 2—2 in FIG. 1 illustrating the principles of the method of the present invention showing the flexibility of the adjustable locating pins during the setting up stages and the action which they have on positioning the indexable cutting inserts in their pockets.

Referring to FIGS. 1 through 3, a milling cutter is disclosed havisg a disc shaped rotatable body member generally referred to as number 10. Body member 10 is provided with a plurality of substantially radial slotted pockets 12 disposed at acute angles to their radii of the rotatable body member 10 so that the end of the pocket 12 toward the center of body member 10 is located ahead of and to lead the end of the pocket 12 near the outer periphery of the body member 10.

The individual pockets 12 are provided with two substantially parallel side walls 14 and 16 and two end portions or end walls 15 and 17. The end walls 15 and 17 define a portion of the outer surface of a pair of adjustable locating pins 18 and 20 which are press fitted and adjustably set in angularly disposed bores 22 and 24 which are provided in the body member 10, as best viewed in FIG. 2. The bores 22 and 24 are substantially co-planar and are angularly disposed from each other. Their disposed angle is dependent upon the geometric shape of the indexable carbide bit or the like which is normally disposed in each pocket 12 and referred to here as a cutting insert 26.

The cutting insert 26 when positioned in the slotted pocket 12 provides for two angularly disposed consecutive cutting edges 28 and 30. The rotatable body member 10 has a face or end surface 32, a side surface 33 and an angular surface 34 which connects the face surface 32 and the side surface 33. The cutting edges 28 and 30 are projected above the face surface 32 and the angular surface 34, respectively, in the present illustration, to permit metal removal in a manner well known in the art.

In the present embodiment illustrating the principles of the invention, cutting insert 26 is shown as a pentagon shaped indexable bit which could be made of various cutting materials such as the hard carbides. When a pentagon shaped cutting insert 26 is utilized the axial angle between the axis of bores 22 and 24 and locating pins 18 and 20 is substantially at a 36° angle and generally referred to as number 31, as viewed in FIG. 2.

The cutting edge 28 is the forward edge of an insert face 29 of the cutting insert 26, and as explained above, projects a short distance above the face surface 32 of the body member 10. The insert face 29 in the present illustration is disposed in a plane not parallel with the plane of face surface 32 but is preferably on an angular relation with the face surface 32 in the order of 2° to 4°, as viewed in FIG. 2, so that the end of the insert face 29 furthest from the center of rotatable body member 10 projects higher than the end of insert face 29 nearer the center of rotatable body member 10. A further angular relationship is established as viewed in FIG. 3 where the side wall 14 is angularly disposed from the face surface 32 to provide for the insert face 29 to make an angle to the face surface 32 in the order of 5°. When the body member 10 is rotated in a counter-clockwise direction as viewed in FIG. 1, the angular relation provides for negative cutting angles in this position. As hereinbefore mentioned, the pockets 12 although generally radially disposed relative to the body member 10, are preferably inclined in an angular position in relation to the true radius of the body member 12 in such a way that the end of the cutting edge 28 corresponding to insert face 29 of the cutting insert 26 closer to the center of body member 10 is the leading edge or ahead of the end of the cutting edge 28 disposed further from the center of body member 10 and closer to its side surface 33. This angle may be, for example, in the order of 8° resulting in the cutting edge 30 of the cutting insert 26 being disposed at a negative cutting angle when the rotatable body member 10 is rotated in the counter-clockwise direction mentioned above.

The radial slotted pockets 12 can be made in the body member 10 in several manners. One method of making pockets 12 would be to have the bores 22 and 24 drilled and reamed as to locate them in both an angular and a radial position by the use of a drilling, boring or jig boring machine. The material between the angular bores 22 and 24 is subsequently removed to form the radially slotted pocket 12 to a predetermined depth and width by a milling operation, so as to define the side walls 14 and 16.

The adjustable locating pins 18 and 20 are the same and have identical elements. Common numbers will be used to designate these elements. The adjustable locating pin 18 and its elements will be discussed in detail as viewed in FIGS. 4, 5 and 6 to more clearly point out some of the advantages and features of the present invention. The adjustable locating pin 18 has a body portion 40 having a bottom end 41 and an adjusting top end 42. The adjusting top end 42 has adjusting flats 43 and 44 extending along a section of the body portion 40 substantially parallel and 180° out of phase with each other.

The body portion 40 includes pin surface 45 and cam surface 46 as its outside circumferential area. The pin surface 45 and the cam surface 46 are connected partial cylindricals, as viewed in FIG. 6. The pin surface 45 has a pin surface center 47 which is also the center of the adjustable locating pin 18. The cam surface 46 has a cam surface center 48. The cam surface center 48 is eccentric from the pin surface center 47 and provides for the middle portion of cam surface 46, generated on the body portion 40, to be closer to the pin center surface 47 than the pin surface 45 is to the pin surface center 47. This is due to the fact that the cam radius 51 is larger than the pin radius 52. The closest point of the cam surface 46 is indicated generally at low point 54. A first high point 55 and a second high point 56 are defined where the cam surface 46 intersects with the pin surface 45. The pin radius 52 is substantially equal to radii of bores 22 and 24 so that a snug or press fit will be provided when the adjustable locating pins 18 and 20 are inserted in the bores 22 and 24, respectively. The full function of the adjustable locating pins 18 and 20 will be discussed in more detail below.

The structure of cutting insert 26, as viewed in FIG. 7, and its adjustability will be discussed in more detail. The cutting edges 28 and 30 intersect at a cutting tip 61. Locating side faces 62 and 63 are provided and connect with cutting edges 28 and 30, respectively. The side faces 62 and 63 are acted upon by locating pins 18 and 20, respectively. A bottom face 65, as the fifth side of cutting insert 26 does not locate on any surface but is positioned in a spaced relationship to a bottom wall 66 of radial slotted pocket 12.

During assembly the milling cutter has the locating pins 18 and 20 positioned in the bores 22 and 24, respectively, with their cam surfaces 46 and/or pin surfaces 47 acting as the end walls 15 and 17 for the radial slotted pocket 12. The cam surfaces 46 and/or pin surfaces 47 can act on their respective locating side faces 62 and 63 of the cutting insert 26 to position the cutting tip 61 at various positions within a predetermined range which thus positions the cutting edges 28 and 30 at the desired location. This predetermined range will increase as the cam radius decreases. When assembling the cutting insert 26 or a master bladed insert is positioned in the radial slotted pocket 12. A maximum-up position is represented by point 57. A maximum-down position is represented by point 58. A maximum-out position is represented by point 59, and a maximum-in position is represented by point 60. These are exaggerated points but are utilized to illustrate the principles of the adjustability of the present invention as will be explained below.

To position the cutting tip 61 at a maximum-down position 58 an assembler can apply a wrench to the adjusting flats 43 and 44 of the adjustable locating pin 18 and 20 and turn the pins so that the low points 54 will be in contact with the locating side faces 62 and 63. When both low points of the cam surfaces for locating pins 18 and 20 act on the cutting insert 26, the bottom face 65 will be at its closest possible position in relationship to the bottom wall 66. The assembler can locate the cutting insert 26 to its maximum-up position 57 by turning the adjustable locating pins 18 and 20 to have either their first high points 55 or their second high points 56 act on their adjacent locating side face 62 and 63 or some portion of the pin surfaces 45.

If the maximum-out position 59 is desired, in other words, having the cutting tip 61 as far removed from the center of disc shape rotatable body 10, the locating pin 18 should be adjusted to have its first high point 55, second high point 56 or some portion of the pin surface 45 act on the locating side face 62 of cutting insert 26 and the locating pin 20 should be adjusted to have its low point 54 act on the locating side face 63 of cutting insert 26. Thus, the locating pin 18 will act on the cutting insert 26 to hold it as far away from the center of body member 10 as possible and the adjustable locating pin 20 will act to allow the cutting insert 26 to move as far out from the center of body member 10 as possible. Thus, the maximum-out position will be down from the maximum-up position, up from the maximum-down position and to the left of a line running between the maximum-up and maximum-down positions, as viewed in FIG. 7.

The maximum-in position is provided by the assembler turning the adjustable locating pin 18 to have its low point 54 act on the locating side face 62 of cutting insert 26 to permit the cutting insert to move as close to the center of body member 10 as possible and the adjustable locating pin 20 to be turned to have its first high point 55, its second high point 56 or some portion of pin surface 45 to act on the locating side face 63 of cutting insert 26 to hold the cutting insert as close as possible to the center of body member 10. The maximum-in position will be down from the maximum-up position, up from the maximum-down position and to the right of a line running between the maximum-up and maximum-down positions, as viewed in FIG. 7.

Various positions between these maximum extremes can be provided by adjusting the locating pins 18 and 20 to various positions to act on the cutting insert 26 in different manners to position it at the exact cutting location desired within its range. This accurate adjustment is particularly important because of the high precision which is presently required in industrial applications and its expected future requirements. This adjustability and rigidity permits precision usage of body member 10 which might have formerly been forced to be designated as defective or scrap part because of some small deviations in the exact positioning of the relationship of all of the bores 22 and all the bores 24. The adjustable locating pins 18 and 20 can be of various quality such as dowel pin types.

In a normal procedure the milling cutter could be set up using master milling blades or sample inserts at the point of assembly before being sent out to the consumer; thus the pins would be set at the point of assembly and then the master milling blades would be removed after the adjustable locating pins were accurately placed in the bores 22 and 24 and adjusted to the proper position. The adjustable top ends 42 of the adjustable locating pins 18 and 20 would be cut off at this time and their remaining ends would be machined to make them flush with the various surfaces. The ends of pins 18 would be surface ground to make them flush with face surface 32. Then depending upon the position of the bores 24, the body member 10 would be mounted on an arbor 70, indicated in phantom in FIG. 1, for re-O.D. grinding off the remaining ends of pins 20 to be flush with the angle surface 34 and/or side surface 33.

The milling cutter has its cutting inserts 26 securely held in position in their radial slotted pockets 12 by means of an eccentric wedge member 75 disposed in a bore 76 substantially parallel to the side walls 14 and 16 of radially slotted pocket 12. The bore 76 opens through the wall 16 of the pocket 12 so as to permit an eccentric cam portion 78 of the eccentric wedge 75 to protrude through the wall for engaging a front face 79 of the cutting insert 26, causing a rear face 81 of the insert 26 to be pressed against side wall 14 of the pocket 12. This pressure action by eccentric wedge member 75 locks the insert 26 in position when it is rotated to a predetermined position, the protruding camming portion 78 of the wedge member 75 being retracted away from the face 79 of the cutting insert 26 when the eccentric wedge member 75 is rotated in an opposite direction so as to release the cutting insert 26 to allow indexing of the insert to provide for new cutting edges or to replace the cutting insert 26 by a new insert.

Oblique cut-out portions or relief surfaces 83 are disposed around the pocket 12 and across the various surfaces of the body member 10; for example, in the present illustration through surface 32 and angular surface 34 so as to provide clearance for the chips removed from a workpiece during a milling operation by the cutting edges 28 and 30.

It can be seen from the above description of the invention that simple and inexpensive, yet practical and durable means have been disclosed for obtaining the desirable ends. Attention is again invited, however, to the possibility of making variations within the spirit and scope of the invention set forth. Also directional terms such as maximum-in, maximum-out, maximum-down, maximum-up, etc. have been used to facilitate explaining the invention in the position and embodiments shown in the drawings and are not to be considered as limiting the scope and spirit of the invention.

Other modes of applying the principle of my invention may be employed instead of those explained, change being made as regards the means and the methods herein disclosed, provided those stated by any one of the following claims or their equivalent be employed.

I therefore particularly point out and distinctly claim as my invention:

1. A cutting insert positioned in a body holder, including in combination:
   (a) a pocket member;
   (b) said pocket member having substantially spaced apart and parallel side walls;
   (c) said pocket having substantially open end portions;
   (d) end bore members positioned at the ends of said pocket and forming said open end portions;
   (e) adjustable means located in said body member to adjustably position said cutting insert in said pocket member;
   (f) said adjustable means including locating pins located in said end bore members;
   (g) said locating pins acting on said cutting insert;
   (h) at least one of said locating pins having an adjustable surface to adjustably locate said cutting insert in said pocket member;
   (i) securing means to secure said cutting insert in said pocket member;
   (j) said locating pins substantially circular in cross-section and having an outer pin surface;
   (k) said pin surface having an axial position substantially the same as the axial position as the end bore member it is positioned in; and
   (l) said adjustable surface being circular in cross-section and having a center different than its said pin surface center and a radius larger than the radius of its said pin surface.

2. A cutting insert positioned in a body holder as defined in claim 1, including in combination:
   (a) said cutting insert having a bottom face;
   (b) said pocket member having a bottom wall; and
   (c) said bottom face being positioned, between said locating pins and adjacent to and spaced from said bottom wall when said cutting insert is secured in said pocket.

3. A cutting insert positioned in a body holder as defined in claim 2, including in combination:
   (a) said locating pin which has an adjustable surface including an adjustable top end;
   (b) said adjustable top end providing adjusting flats which may be acted on to position said adjustable surface; and
   (c) said adjustable surface acting on said cutting insert to position it over a predetermined range of cutting positions.

4. A cutting insert positioned in a body holder as defined in claim 3, including in combination:
   (a) a side bore positioned with respect to said side walls and forming an opening in one of said side walls;
   (b) said securing means including wedge member positioned in said side bore member;
   (c) said wedge member having an eccentric cam portion to act on said cutting insert when positioned in said pocket member; and
   (d) said cam portion holds said cutting insert against said side wall not acted on by said side bore.

5. A cutting insert positioned in a body holder as defined in claim 4, including in combination:
   (a) both of said locating pins having adjustable surfaces to act on said cutting insert;
   (b) said locating pins having adjustable top ends and body portions;
   (c) said body portions including pin surfaces circular in cross-section and having radii substantially the same as said end bore members; and
   (d) said locating pins having adjustable surfaces in the form of cam surfaces which are circular in cross-section and have a center eccentric from said pin surface center and having radii larger than said pin surface radii.

6. A cutting insert positioned in a body holder as defined in claim 5, including in combination:
   (a) said adjusting top end having adjusting flats which can be acted on to position said cam surfaces to position the cutting insert at a cutting position within a predetermined cutting range.

7. A cutting insert positioned in a body holder as defined in claim 6, including in combination:

(a) a side bore positioned with respect to said side walls and forming an opening in one of said side walls;
(b) said securing means including a wedge member positioned in said side bore member;
(c) said wedge member having an eccentric cam portion; and
(d) said wedge member being rotatable in said side bore member to have said eccentric cam portion act on the cutting insert to secure it against said side wall not having said opening.

8. A milling cutter having a disc shaped rotatable body member, including in combination:
(a) a plurality of pocket members substantially equally spaced about said rotatable body member and positioned substantially an equal distance from said rotatable body member's center;
(b) said pocket members having spaced and parallel back and front side walls;
(c) said pocket members having open end portions;
(d) end bore members positioned at the end of said pocket members and forming said open end portions;
(e) solid locating pins positioned in said end bore members;
(f) cutting inserts positioned in said pocket members;
(g) said locating pins adjustably positioning said cutting inserts in said pocket members;
(h) securing means to secure said cutting inserts in said pocket members;
(i) said locating pins having pin surfaces and cam surfaces co-acting to cause the adjustable positioning of said cutting inserts;
(j) said pin surfaces being substantially circular in cross-section and having a pin surface center with a radius substantially equal to the radius of said bore member;
(k) said cam surfaces being substantially circular in cross-section and having a cam surface center eccentric from said pin surface center and a radius larger than said pin surface radius;
(l) said cam surfaces are positioned closer to said pin center than said pin center surfaces are positioned to said pin surface center;
(m) said cam surfaces intersecting said pin surface at two positions; and
(n) said positions of intersection between said cam surfaces and said pin surfaces being indicated as high points on said locating pin's outer surface and said middle portion of said cam surfaces being indicated as low points.

9. A milling cutter as defined in claim 8, including in combination:
(a) said cutting inserts having bottom faces;
(b) said pocket members having bottom walls; and
(c) said bottom faces being positioned between said locating pins and adjacent to and spaced from said bottom walls when said cutting inserts are secured in said pocket members.

10. A milling cutter as defined in claim 9, including in combination:
(a) wedge member bores positioned with respect to said side walls and forming an opening along said front walls;
(b) wedge members positioned in said wedge member bores;
(c) said wedge members being rotatably positioned in said wedge member bores and having eccentric cam portions; and
(d) said cam portions acting on said cutting inserts to secure them in their said pocket members against said back walls.

References Cited
UNITED STATES PATENTS

| | | | |
|---|---|---|---|
| 1,855,511 | 4/1932 | Edgar | 29—105 |
| 2,950,524 | 6/1955 | Frommelt et al. | 29—105 X |
| 3,163,920 | 1/1965 | Stier | 29—105 |

GIL WEIDENFELD, Primary Examiner

U.S. Cl. X.R.

76—101